US008016234B2

(12) United States Patent
Müller et al.

(10) Patent No.: US 8,016,234 B2
(45) Date of Patent: Sep. 13, 2011

(54) AIRFRAME STRUCTURE OF AN AIRCRAFT OR SPACECRAFT

(75) Inventors: Markus Müller, Friedrichshafen (DE); Lars Fiedler, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 801 days.

(21) Appl. No.: 11/891,755

(22) Filed: Aug. 13, 2007

(65) Prior Publication Data
US 2008/0173765 A1    Jul. 24, 2008

Related U.S. Application Data

(60) Provisional application No. 60/843,987, filed on Sep. 12, 2006.

(51) Int. Cl.
*B64C 1/00* (2006.01)
(52) U.S. Cl. ............... 244/119; 244/158.1; 244/100 R; 244/102 R
(58) Field of Classification Search ............... 244/158.1, 244/158.9, 159.3, 100 R, 102 R, 103 R, 117 R, 244/119, 120, 131; 220/669, 670, 672
See application file for complete search history.

(56) References Cited

U.S. PATENT DOCUMENTS

| 291,004 | A | * | 12/1883 | Rosenstell | 220/672 |
|---|---|---|---|---|---|
| 2,667,316 | A | * | 1/1954 | Winter et al. | 244/102 R |
| 2,759,690 | A | * | 8/1956 | Dewar | 244/111 |
| 5,346,371 | A | * | 9/1994 | Bialy et al. | 417/312 |
| 5,692,703 | A | * | 12/1997 | Murphy et al. | 244/102 R |
| 6,213,428 | B1 | * | 4/2001 | Chaumel et al. | 244/119 |
| 6,247,668 | B1 | | 6/2001 | Reysa et al. | |
| 6,712,575 | B1 | * | 3/2004 | Tuma et al. | 413/2 |

* cited by examiner

*Primary Examiner* — Joshua Michener
(74) *Attorney, Agent, or Firm* — Husch Blackwell LLP

(57) ABSTRACT

The present invention provides an airframe structure of an aircraft or spacecraft, with: a hollow body section which can be subjected to an internal pressure; a membrane arrangement which has at least one single-part, multi-curved membrane component for sealing off the internal pressure from an external pressure which acts on the hollow body section and differs from the internal pressure; and a joining structure for a pressure tight joining of the membrane arrangement to a region of the hollow body section; wherein the membrane arrangement forms a receiving well which is accessible from outside the hollow body section, extends at least partially into the hollow body section and is for receiving a component of the aircraft or spacecraft.

21 Claims, 4 Drawing Sheets

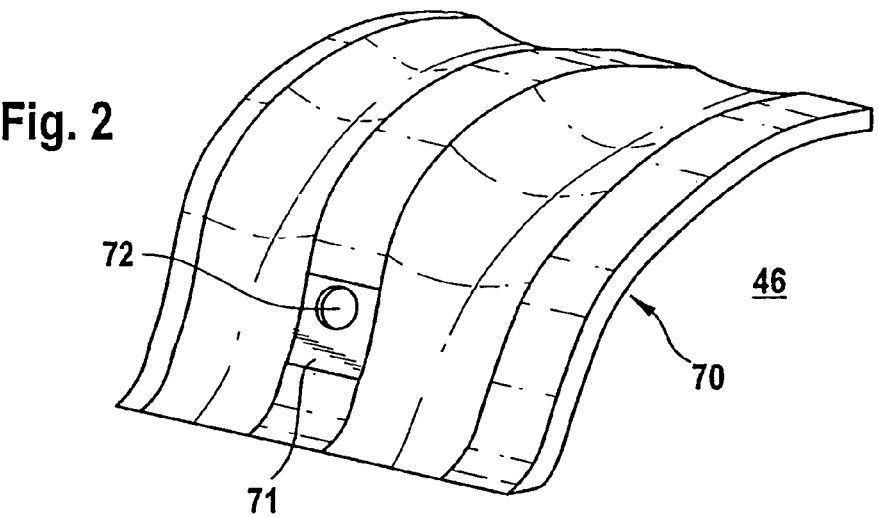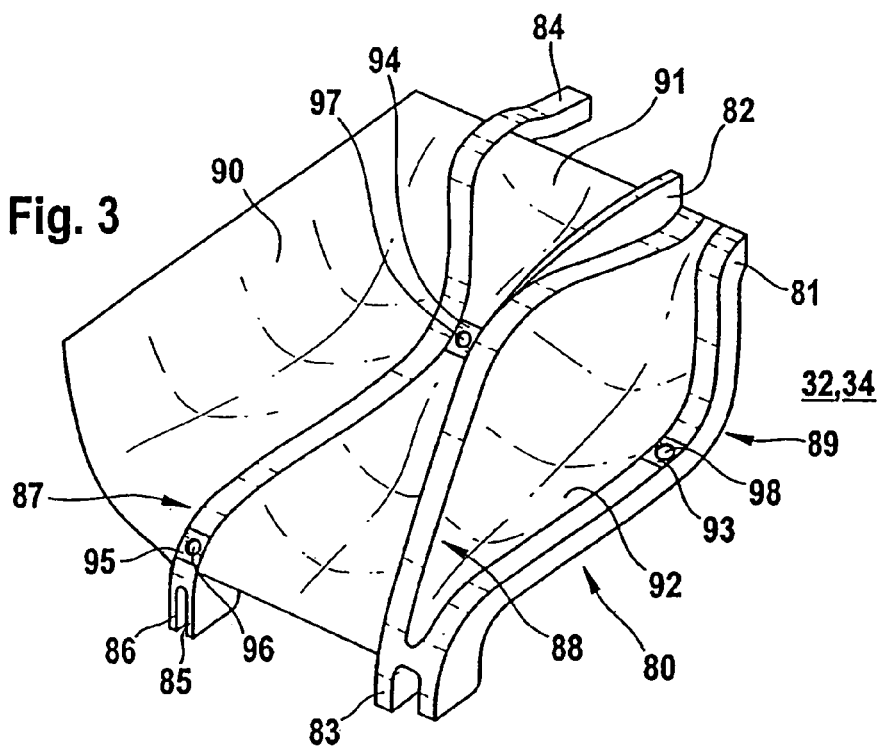

(I-I)

(II-II)

(III-III)

AIRFRAME STRUCTURE OF AN AIRCRAFT OR SPACECRAFT

CROSS-REFERENCE TO RELATED APPLICATION

This application claims priority of U.S. Provisional Application Ser. No. 60/843,987 filed Sep. 12, 2006.

FIELD OF THE INVENTION

The present invention is concerned with an airframe structure of an aircraft or spacecraft.

BACKGROUND OF THE INVENTION

Although applicable to any airframe structures, the present invention and the problem on which it is based are explained in more detail with reference to a landing gear well in an aircraft fuselage.

In order to explain the general problem, FIG. 5 shows, in a perspective view, a section through an aircraft fuselage section 1 which has a landing gear well 2. The landing gear well 2 has essentially two functions:

First of all, the landing gear well 2 serves to accommodate the landing gear 3 during the flight phase. For this purpose, after the aircraft has taken off, the landing gear 3 is retracted from a deployed position into a retracted position, with essential parts of the landing gear 3, in particular the wheels, projecting into the landing gear well 2.

In the event of a difference in pressure between the cabin pressure prevailing in the interior 4 of the aircraft and the atmospheric external pressure prevailing in the interior 7 of the landing gear well 2, considerable loads act on the landing gear well 2. In addition to simply accommodating the landing gear 3, a further function of the landing gear well 2 is consequently to ensure absorption of the loads resulting from the difference in pressure and to guarantee sealing under pressure.

In order to satisfy these two functions, the conventional landing gear well 2 has the following structure which is explained briefly with reference to FIG. 5:

A rear pressure bulkhead 5—the view in FIG. 5 is oriented approximately in the direction of the aircraft nose, a cover surface 9 and a further front pressure bulkhead, not illustrated, form the landing gear well 2 and end in a pressure tight manner with the fuselage shell 6.

The rear pressure bulkhead 5 has a flat, rear pressure plate 12, the latter being reinforced by means of braces 18 . . . 23. The cover surface 9 is provided with membrane components 25 . . . 30 with a single curvature. The curvature of the membrane components 25 . . . 30 improves the force flux, which results from the difference in pressure, in the membrane components 25 . . . 30 in such a manner that bending stresses therein are greatly reduced, and they can therefore be designed to be substantially thinner than the rear pressure plate 12 and therefore to have a lower weight.

The problem therewith is that the front and rear pressure bulkhead 5 contribute substantially to the aircraft weight and therefore reduce the payload of the aircraft.

It is therefore the object of the present invention to provide a lighter landing gear well which, in particular, is suitable for any desired construction spaces and joining requirements.

SUMMARY OF THE INVENTION

Accordingly, an airframe structure of an aircraft or spacecraft is provided, with a hollow body section which can be subjected to an internal pressure, a membrane arrangement which has at least one single-part, multi-curved membrane component for sealing off the internal pressure from an external pressure acting on the hollow body section, and a joining structure for a pressure tight joining of the membrane arrangement to a region of the hollow body section, wherein the membrane arrangement forms a receiving well which is accessible from outside the hollow body section, extends at least partially into the hollow body section and is for receiving a component of the aircraft or spacecraft.

The idea on which the present invention is based is that, instead of the rear and front pressure plate and the membrane components which have a single curvature and connect the latter, use can be made of at least one multi-curved membrane component. In comparison to the conventional structure comprising rear and front pressure plate and membrane components with a single curvature, a multi-curved membrane component of this type has a substantially better force flux and therefore lower stresses. As a consequence of the lower stresses, the material thickness of the multi-curved membrane component can be reduced, which leads to an overall, lighter airframe structure. An increase in the payload of the aircraft is therefore obtained.

Advantageous refinements, developments and improvements of the invention are found in the subclaims.

According to a preferred development of the invention, the at least one membrane component is stiffened by means of at least one brace. Braces permit the membrane component to be reinforced for a specific load situation while adding little weight.

According to a preferred exemplary embodiment of the invention, the at least one brace is formed integrally with the membrane component. Connecting means between brace and membrane component can therefore be omitted, which overall increases the strength of the membrane arrangement and reduces the weight thereof. The manufacturing process for a membrane component of this type with a brace can also be designed very simply and economically. For example, the brace and the membrane component can be constructed from a carbon fibre plastic (CFP) and hardened to form one piece. The at least one brace preferably has a T-, Ω-, U-, L-, C-, and/or Z-shaped cross section at least in some sections. No matter what the load situation, braces of this type are readily suitable for reinforcing the at least one membrane component. The braces are suitable for providing directed load paths and are suitable for reinforcing the membrane component against bulging and/or being knocked through. The loads arising from the differential pressure are preferably conducted into the braces, thus reducing stresses in the membrane components. Being knocked through is to be understood as meaning a deformation of a membrane component counter to its direction of curvature under pressure—i.e., for example, an initially convex region of the membrane component is changed into a concave shape by means of pressure.

In a further preferred development of the invention, the at least one brace is of curved design, in particular multi-curved design, at least in some sections. Here too, it is a matter of adapting the at least one brace as optimally as possible to one or more specific load situations. The brace preferably follows one or more of the curvatures of the membrane component. Curved profiles without a turning point are preferably used in at least one direction in space.

In a further preferred exemplary embodiment of the invention, the at least one brace is designed for joining adjacent components and/or equipment components to the membrane arrangement. The membrane component per se, because of its small thickness, is only suitable with difficulty for the direct joining of components and/or equipment components. For example, the placing of bores in the membrane component, with the centre line of the bore lying in the plane of the membrane component, is virtually impossible. It is much simpler to place bores of this type in the braces. Examples of such adjacent components and/or equipment components may be hydraulic cylinders, cross-struts, hoses, cables, hose or cable mountings.

According to a further preferred development of the invention, the membrane arrangement and/or the at least one brace is connected to a stabilizing framework and/or to a supporting strut. In this case, the framework may be of open or closed design. The framework and the supporting strut serve to reinforce the membrane arrangement and/or to mount the latter in the airframe structure.

According to a further preferred exemplary embodiment of the invention, the membrane arrangement and/or the at least one brace is/are connected to seat rails, to longitudinal members and/or to cross members in some sections or over its/their entire length. In this exemplary embodiment, in addition to the sealing function and receiving function for the component of the aircraft and spacecraft, the membrane arrangement advantageously also takes on the function of supporting the seat rail. A connection of the membrane arrangement to longitudinal and/or cross members increases the overall strength of the airframe structure.

In a further preferred embodiment of the invention, a plurality of membrane components are provided which are connected to one another in connecting regions in order to form the membrane arrangement, in particular as a single part. A plurality of membrane components can therefore be combined in such a manner that they are optimized for one or more specific load situations and/or optimum utilization of the existing construction space is achieved. An integral formation of the membrane arrangement from a plurality of membrane components can result in a simplified production process with few manual steps.

According to a further preferred development of the invention, the connecting region has the at least one brace. Connecting regions, in particular if the membrane arrangements are not of integral design, frequently constitute mechanical weak points. Consequently, stiffening by means of a brace is advantageous in these regions.

In a further preferred development of the invention, the connecting regions between the plurality of membrane components are provided with passages. Such passages—to be understood as meaning passage openings—permit the interior of the hollow body section to be connected to the interior of the receiving well. The passages are preferably designed for the passage of electric, pneumatic, hydraulic and/or optical systems. A system-engineering connection of this type between the interior of the hollow body section and the interior of the receiving well may be required in particular for control systems of the aircraft periphery. The connecting regions are preferably designed as planar surfaces. This feature greatly simplifies a pressure tight design of the passages by the use of appropriate sealants.

According to a preferred exemplary embodiment, the at least one membrane component and/or brace has a fibre composite material, metal, plastic and/or ceramic. Owing to their high strength at low weight and also their simple mouldability into a complex, in particular multi-curved, design, fibre composite materials would seem to be particularly suitable. In particular, infusion and prepreg processes are suitable production processes here. A membrane arrangement which comprises a plurality of membrane components and braces and is produced in a single piece from a carbon fibre composite material would seem particularly advantageous. The combination of a plurality of fibre composite materials is also conceivable.

According to a further preferred development of the invention, the component to be received is designed as an adjustable, raiseable and/or retractable peripheral part, in particular as landing gear. In particular for peripheral parts, there is often the need to move them into a protected position within the hollow body section. Examples of such peripheral parts are antennae, emergency chutes and guns. Other types of components, such as, for example, bombs or rockets, are also possible.

According to a preferred embodiment of the invention, the joining structure has weld seams, rivets and/or adhesive. These are particularly suitable for providing a pressure tight connection between the hollow body section and the membrane arrangement. In a preferred development of the invention, the joining structure is formed integrally with the hollow body section and/or the membrane arrangement. In this case, the joining structure may merely be designed as a region in which the hollow body section merges, in particular continuously, into the membrane arrangement. In this embodiment, the hollow body section and the membrane arrangement can be manufactured, for example, from a single piece in a CFP construction, which results in weight advantages in comparison to the use of rivets, for example.

The hollow body section is preferably designed as a fuselage segment or wing segment. It is frequently necessary to move components into the fuselage or into the wing, since they have a comparatively large interior.

According to a further preferred development of the invention, the at least one membrane component has approximately a saddle-shaped design. This results in an advantageous force flux in a comparatively large receiving well, the latter having a design which is suitable in particular for receiving a landing gear.

The invention is explained in more detail below using exemplary embodiments and with reference to the attached figures of the drawings.

BRIEF DESCRIPTION OF THE DRAWINGS

FIG. 2 shows a perspective view of a membrane arrangement according to a second exemplary embodiment of the invention;

FIG. 3 shows a perspective view of a membrane arrangement according to a third exemplary embodiment of the invention;

DETAILED DESCRIPTION OF THE INVENTION

Figure 1:
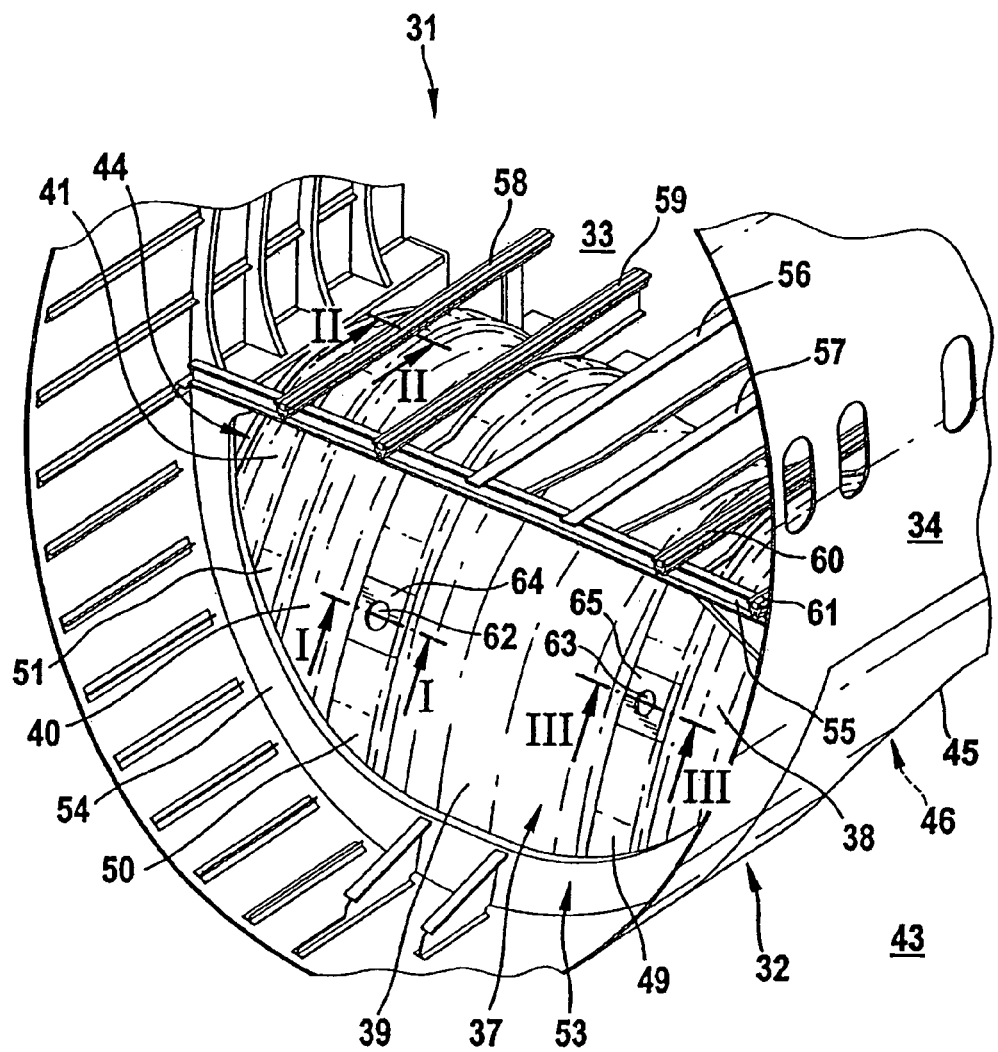
FIG. 1 shows, schematically, a perspective view of a section through an airframe structure according to a first exemplary embodiment of the invention.

FIG. 1 shows a perspective view of a section through an airframe structure 31 according to a first exemplary embodiment of the invention.

The airframe structure 31 has a hollow body section 32 designed as a fuselage shell. The hollow body section 32 has an interior 33 and a skin 34. The interior 33 is under cabin pressure during the flight phase of the aircraft.

A membrane arrangement 37 is arranged within the hollow body section 32. The membrane arrangement 37 is divided into preferably a plurality of membrane components 38, 39, 40, 41, preferably into between 2 and 21 membrane components. The membrane components 38 . . . 41 are each designed as single-part, doubly curved, sheet-like elements, preferably made of carbon fibre composite material. The membrane components ensure that the internal pressure is sealed off from the atmospheric external pressure acting in the surroundings 43 of the airframe structure 31. Furthermore, a joining structure 44 is provided which is formed by means of rivets, weld seams and/or adhesive and ensures pressure tight joining of the membrane arrangement to the skin 34 of the hollow body section 32.

The plurality of membrane components 38 . . . 41 are connected to one another at connecting regions 49 . . . 51. The connecting regions 49 . . . 51 preferably have connecting region sections 64, 65 with passages 62, 63. Hydraulic hoses or electric cables, for example, may be guided through the passages 62, 63. For simple sealability, the connecting region sections 64, 65 are of planar design.

Below the membrane arrangement 37, the skin 34 of the hollow body section 32 is at least partially recessed (not illustrated) and is covered by means of flaps 45 during the flight phase, with a landing gear, not illustrated, being at least partially located within the landing gear well 46 formed by the membrane arrangement 37.

A framework 53 preferably reinforces the airframe structure 31 in the region of the membrane arrangement 37 and is preferably connected to the membrane arrangement in order to stabilize the latter. In addition, the framework 53, which has a front frame 54 and a cross member 55, can also form part of the joining structure 44. Longitudinal members 56, 57 preferably extend from the cross member 55 and serve to further stabilize the airframe structure 31. Seat rails 58 . . . 61 for fastening seats in the aircraft also extend therefrom and rest partially on the connecting regions 49 . . . 51.

The membrane components 38 . . . 41 preferably each approximately have a saddle shape, the saddle being oriented transversely with respect to the hollow body section 32. The saddles of the membrane components 38 . . . 41 are preferably arranged consecutively, as seen in the transverse direction of the hollow body section. However, membrane components 38 . . . 41 shaped in any other desired manner are also conceivable. The curvatures can be defined by any desired functions, for example polynomial functions or sine functions. Wave-like curvatures of the membrane components 38 . . . 41 are conceivable.

FIG. 2 shows, in a perspective view, a membrane arrangement 70 according to a second exemplary embodiment of the invention. The membrane arrangement 70 corresponds in type to the membrane arrangement 37 according to the first exemplary embodiment and may also be inserted instead of, in addition to or as a supplement to the latter into the airframe structure 31, but shows, in enlarged form, a planar, i.e. non-curved, connecting region section 71.

The connecting section 71 has a passage 72 for the passage of any desired systems, for example hydraulic hoses, power line, etc., from the interior 33 into the-landing gear well 46.

FIG. 3 shows, in a perspective view, a membrane arrangement 80 which corresponds in type to the membrane arrangement 37 according to the first exemplary embodiment and can also be inserted into the airframe structure 31 in place of said membrane arrangement or in addition thereto or as a supplement thereto. The membrane arrangement 80 has braces 81 . . . 86 for reinforcing the membrane arrangement 80 at the connecting regions 87 . . . 89 between membrane components 90 . . . 92 and/or the skin 34 of the hollow body section 32. Furthermore, planar connecting region sections 93 . . . 95 are provided with passages 96 . . . 98 on the membrane arrangement 80.

The characteristic feature here is that the braces 81 . . . 86 are provided with multiple curvatures and follow the curvatures of the membrane components 90 . . . 92. The characteristic feature of the connecting region section 94 is that the latter is arranged between and adjacent to the braces 83 and 84. The distance between the braces 83, 84 is preferably between 50 and 400 mm. By means of this feature, a high mechanical load-bearing capacity of the connecting region section 94 can be obtained.

Figure 4A:
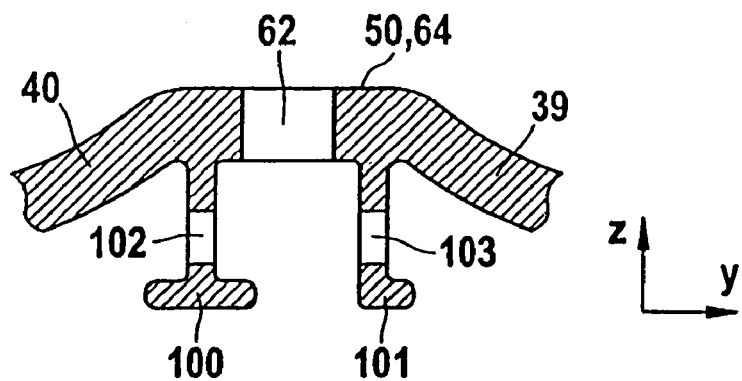
FIG. 4A shows a sectional view along the section line I-I from FIG. 1.
Figure 4B:
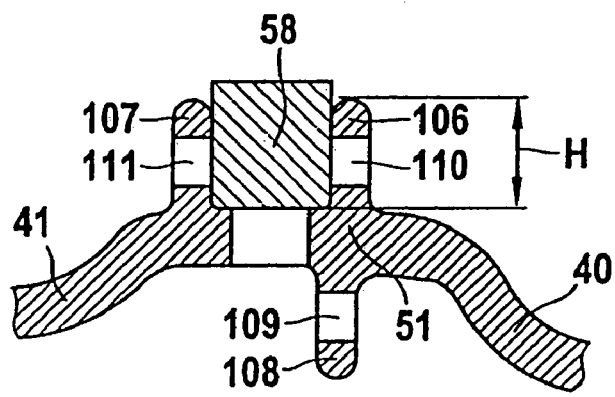
FIG. 4B shows a sectional view along the section line II-II from FIG. 1.
Figure 4C:
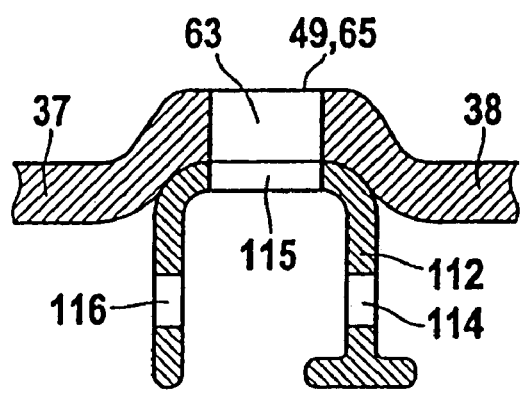
FIG. 4C shows a sectional view along the section line III-III from FIG. 1.
Figure 5:
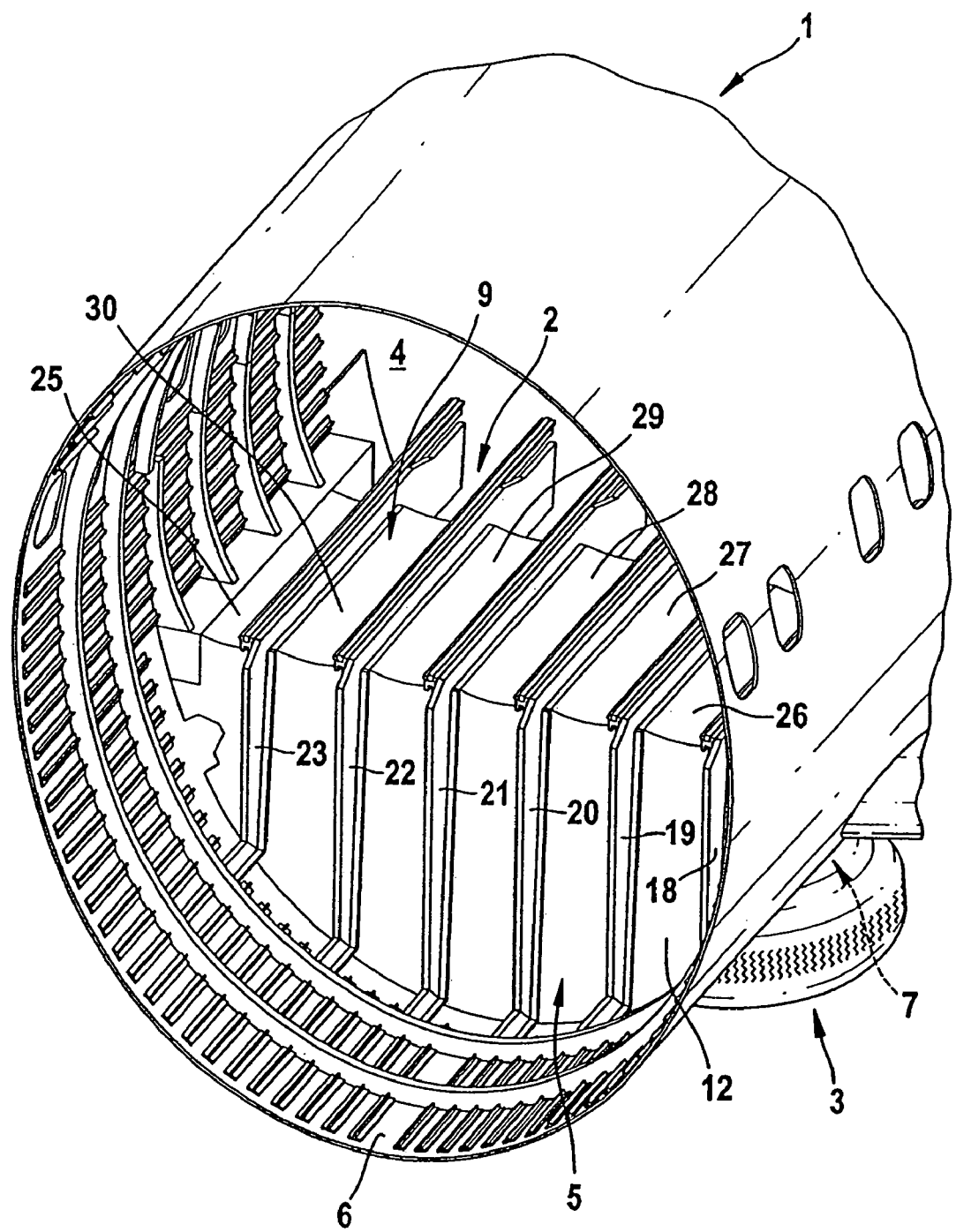
FIG. 5 shows, schematically, an airframe structure for explaining the general problem.

FIGS. 4A to 4C show exemplary partial sections I-I, II-II and III-III from FIG. 1.

The connecting region 50 from FIG. 4*a* is connected integrally to a brace 100, which has a T-shaped cross section, and to a brace 101 which runs parallel thereto and has an L-shaped cross section. The braces 100, 101 have passages 102 and 103, respectively—these are to be understood in particular as meaning holes, which can be provided, for example, for the fastening of bolts. The bolts can be designed for the mounting of equipment components, i.e., for example, hydraulic actuators or mountings for cables or hoses. Furthermore, supporting struts can be fastened at the passages 102, 103.

In FIG. 4*b*, braces 106 . . . 108 are provided which extend in their cross section on both sides approximately vertically from the plane of the membrane components 38 . . . 41 and the plane of the connecting region 51. The height H of the braces is preferably between 5 and 520 mm.

The seat rail 58 is guided between the two braces 106, 107 and can be screwed on through the holes 110, 111. The hole 109 can be used, in turn, as a mounting.

FIG. 4*c* shows a U-shaped brace 112 which is fastened to the connecting region 49 preferably by means of adhesive or a weld seam and is provided at its one end with a T-shaped section and at its other end with an essentially straight section. Furthermore, holes 114 . . . 116 are provided in the brace 112. The functions of the holes correspond to those of the holes from the exemplary embodiment according to FIG. 4*a*. The brace 112 is consequently designed here as a separate part. For example, said brace 112 can also be connected fixedly to the connecting region section 65 by means of a screw connection through the holes 63 and 115.

Although the present invention has been described here with reference to preferred exemplary embodiments, it is not restricted thereto but rather can be modified in diverse ways. In particular, the exemplary embodiments can be combined with one another.

For example, mixed materials can be used for the construction of the membrane arrangement. The membrane components could therefore each be manufactured from CFP material and the connecting regions from metal, in particular aluminium or titanium.

The invention can be generally expanded in particular to include pressurized well arrangements and is not restricted to airframe structures. The airframe structure described in the exemplary embodiment merely constitutes one embodiment of a pressurized well arrangement within the meaning of the present patent application. Pressurized well arrangements of this type can be used, for example, in submarines or tankers or vacuum applications, i.e. wherever a receiving well is to be formed which has to withstand a differential pressure.

LIST OF REFERENCE NUMBERS

1 Aircraft fuselage section
2 Landing gear well

3 Landing gear
4 Interior
5 Rear pressure bulkhead
6 Fuselage shell
7 Interior of the landing gear well
9 Cover surface
12 Rear pressure plate
18 Brace
19 Brace
20 Brace
21 Brace
22 Brace
23 Brace
25 Membrane component
26 Membrane component
27 Membrane component
28 Membrane component
29 Membrane component
30 Membrane component
31 Airframe structure
32 Hollow body section
33 Interior
34 Skin
37 Membrane arrangement
38 Membrane component
39 Membrane component
40 Membrane component
41 Membrane component
43 Surroundings
44 Joining structure
45 Flaps
46 Landing gear well
49 Connecting region
50 Connecting region
51 Connecting region
53 Framework
54 Frame
55 Cross member
56 Longitudinal member
57 Longitudinal member
58 Seat rail
59 Seat rail
60 Seat rail
61 Seat rail
62 Passage
63 Passage
64 Connecting region section
65 Connecting region section
70 Membrane arrangement
71 Connecting region section
72 Passage
80 Membrane arrangement
81 Brace
82 Brace
83 Brace
84 Brace
85 Brace
86 Brace
87 Connecting region
88 Connecting region
89 Connecting region
90 Membrane component
91 Membrane component
92 Membrane component
93 Connecting region section
94 Connecting region section
95 Connecting region section
96 Passage
97 Passage
98 Passage
100 Brace
101 Brace
102 Hole
103 Hole
106 Brace
107 Brace
108 Brace
109 Hole
110 Hole
111 Hole
112 Brace
114 Hole
115 Hole
116 Hole

What is claimed is:

1. An airframe structure of an aircraft or spacecraft, with:
a hollow body section which can be subjected to an internal pressure;
a membrane arrangement which has at least one single-part, multi-curved membrane component for sealing off the internal pressure from an external pressure which acts on the hollow body section and differs from the internal pressure; and
a joining structure for a pressure tight joining of the membrane arrangement to a region of the hollow body section;
wherein the at least one membrane component bulges into the hollow body section and forms a part of a receiving well which is accessible from outside the hollow body section, extends at least partially into the hollow body section and is for receiving a component of the aircraft or spacecraft.

2. The airframe structure according to claim 1, wherein the at least one membrane component is stiffened by means of at least one brace to provide directed load paths.

3. The airframe structure according to claim 2, wherein the at least one brace is formed integrally with the membrane component.

4. The airframe structure according to claim 2, wherein the at least one brace has a T-, Ω-, U-, L-, C-, or Z-shaped cross section at least in some sections.

5. The airframe structure according to claim 2, wherein the at least one brace is curved at least in some sections.

6. The airframe structure according to claim 2, wherein the at least one brace includes multiple curves.

7. The airframe structure according to claim 2, wherein the at least one brace is adapted for joining adjacent components or equipment components to the membrane arrangement.

8. The airframe structure according to claim 1, wherein the membrane arrangement or at least one brace is connected to a stabilizing framework and/or to at least one supporting strut.

9. The airframe structure according to claim 1, wherein the membrane arrangement or at least one brace is connected to seat rails, to cross members and/or to longitudinal members in some sections or over its/their entire length.

10. The airframe structure according to claim 1, wherein a plurality of membrane components are provided which are connected to one another in connecting regions in order to form the membrane arrangement.

11. The airframe structure according to claim 10, wherein the connecting regions include at least one brace.

12. The airframe structure according to claim 10, wherein the connecting regions between the plurality of membrane components are provided with passages.

13. The airframe structure according to claim 10, wherein the connecting regions are designed at least in some sections as planar surfaces.

14. The airframe structure according to claim 12, wherein the passages are designed for the passage of electric, pneumatic, hydraulic or optical systems.

15. The airframe structure according to claim 1, wherein the at least one membrane component or at least one brace comprises a fibre composite material, plastic, metal and/or ceramic.

16. The airframe structure according to claim 1, wherein the component is an adjustable, raiseable or retractable peripheral part.

17. The airframe structure according to claim 1, wherein the component is a landing gear.

18. The airframe structure according to claim 1, wherein the joining structure includes rivets, screws or an adhesive, and/or in that the joining structure is integral with the hollow body section and/or the membrane arrangement.

19. The airframe structure according to claim 1, wherein the hollow body section is a fuselage segment or wing segment.

20. The airframe structure according to claim 1, wherein the at least one membrane component has a saddle-shaped design.

21. The airframe structure according to claim 1, wherein the joining structure lies in more than one plane.

* * * * *